US010540828B2

(12) United States Patent
Ahn et al.

(10) Patent No.: US 10,540,828 B2
(45) Date of Patent: Jan. 21, 2020

(54) GENERATING ESTIMATES OF FAILURE RISK FOR A VEHICULAR COMPONENT IN SITUATIONS OF HIGH-DIMENSIONAL AND LOW SAMPLE SIZE DATA

(71) Applicant: International Business Machines Corporation, Armonk, NY (US)

(72) Inventors: Hyung-il Ahn, San Jose, CA (US); Matthew Denesuk, Ridgefield, CT (US); Axel Hochstein, San Jose, CA (US); Ying Tat Leung, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 14/498,707

(22) Filed: Sep. 26, 2014

(65) Prior Publication Data

US 2016/0093118 A1 Mar. 31, 2016

(51) Int. Cl.
*G07C 5/00* (2006.01)
*B60K 35/00* (2006.01)

(52) U.S. Cl.
CPC .............. *G07C 5/006* (2013.01); *B60K 35/00* (2013.01)

(58) Field of Classification Search
CPC combination set(s) only.
See application file for complete search history.

(56) References Cited

U.S. PATENT DOCUMENTS 5,280,223 A 1/1994 Grabowski
5,791,441 A 8/1998 Matos et al.
(Continued)

FOREIGN PATENT DOCUMENTS

CN 103778339 A 5/2014
EP 0126402 A2 11/1984
(Continued)

OTHER PUBLICATIONS ip.com, Method for Visual Life Indication of Flash Based Storage Devices, IPCOM000236342D, Apr. 21, 2014.
ip.com, IBM, Wear-Leveling Technique for EEPROM devices, IPCOM000187712D, Sep. 2009.
Jardine et al. Optimizing a Mine Haul Truck Wheel Motors' Condition Monitoring Program: Use of Proportional Hazard Modeling, Case Study Report, Optimal Maintenance Decision Inc. 2001.
Tian et al. Condition Based Maintenance Optimization Considering Multiple Objectives, Journal of Intelligent Manufacturing 23, 2, 333-340. 2012.
(Continued)

*Primary Examiner* — Thomas G Black
*Assistant Examiner* — Ana D Thomas
(74) *Attorney, Agent, or Firm* — Ryan, Mason & Lewis, LLP (57) ABSTRACT

Methods, systems, and computer program products for generating estimates of failure risk for a vehicular component in situations of high-dimensional and low sample size data are provided herein. A method includes splitting a first input time series comprising multiple data points derived from a vehicular component across a fleet of multiple vehicles into multiple sub-time series; generating a first failure status predicting function of a first selected sub-time series; deleting, from the first input time series, the portion of the data points that corresponds to the first selected sub-time series; repeating the preceding two steps for a second selected sub-time series; generating a second failure status predicting function of each selected sub-time series; applying each second failure status predicting function to a second input time series to calculate prediction of failure values; and identifying the largest prediction of failure value as an estimate of failure risk for the vehicular component.

20 Claims, 3 Drawing Sheets

(56) References Cited

U.S. PATENT DOCUMENTS

| | | | |
|---|---|---|---|
| 6,085,154 | A | 7/2000 | Leuthausser et al. |
| 6,330,499 | B1 | 12/2001 | Chou et al. |
| 6,424,930 | B1 | 7/2002 | Wood |
| 6,484,080 | B2 | 11/2002 | Breed |
| 6,748,305 | B1 | 6/2004 | Klausner et al. |
| 6,834,256 | B2 | 12/2004 | House |
| 7,103,460 | B1 | 9/2006 | Breed |
| 7,369,925 | B2 | 3/2008 | Morioka et al. |
| 7,383,165 | B2 | 6/2008 | Aragones |
| 7,418,321 | B2 | 8/2008 | Boutin |
| 7,428,541 | B2 | 9/2008 | Houle |
| 7,474,988 | B2 | 1/2009 | Kamisuwa et al. |
| 7,489,994 | B2 | 2/2009 | Isono et al. |
| 7,567,972 | B2 | 7/2009 | Geselhart et al. |
| 7,920,944 | B2 | 4/2011 | Gould |
| 8,024,084 | B2 | 9/2011 | Breed |
| 8,068,104 | B2 | 11/2011 | Rampersad |
| 8,131,420 | B2 | 3/2012 | Lynch et al. |
| 8,200,389 | B1 | 6/2012 | Thompson et al. |
| 8,224,765 | B2 | 7/2012 | Khalak et al. |
| 8,229,624 | B2 | 7/2012 | Breed |
| 8,229,900 | B2 | 7/2012 | Houle |
| 8,285,438 | B2 | 10/2012 | Mylaraswamy et al. |
| 8,311,858 | B2 | 11/2012 | Everett et al. |
| 8,359,134 | B2 | 1/2013 | Maesono |
| 8,374,745 | B2 | 2/2013 | Zhang et al. |
| 8,452,481 | B2 | 5/2013 | Ishiko et al. |
| 8,543,280 | B2 | 9/2013 | Ghimire |
| 8,548,671 | B2 | 10/2013 | Wong et al. |
| 8,626,385 | B2 | 1/2014 | Humphrey |
| 8,676,631 | B2 | 3/2014 | Basak |
| 9,286,735 | B1 * | 3/2016 | Ahn .................... G06N 7/005 |
| 2003/0095278 | A1 | 5/2003 | Schwartz et al. |
| 2003/0137194 | A1 * | 7/2003 | White .................... B60L 3/12 |
| | | | 307/10.1 |
| 2005/0065678 | A1 * | 3/2005 | Smith .................... G06Q 10/00 |
| | | | 701/31.4 |
| 2008/0036487 | A1 | 2/2008 | Bradley |
| 2010/0198771 | A1 * | 8/2010 | Khalak ................ G05B 23/024 |
| | | | 706/52 |
| 2010/0332201 | A1 | 12/2010 | Albarede et al. |
| 2011/0118905 | A1 | 5/2011 | Mylaraswamy |
| 2013/0035822 | A1 | 2/2013 | Singh et al. |
| 2014/0336869 | A1 | 11/2014 | Bou-Ghannam et al. |
| 2016/0093117 | A1 * | 3/2016 | Ahn .................... G05B 23/024 |
| | | | 701/29.3 |
| 2016/0093119 | A1 * | 3/2016 | Ahn .................... G07C 5/006 |
| | | | 701/29.3 |

FOREIGN PATENT DOCUMENTS

| | | | |
|---|---|---|---|
| EP | 1110096 | B1 | 6/2011 |
| EP | 2730448 | A1 | 5/2014 |
| JP | 06331504 | A | 12/1994 |
| JP | 07028523 | A | 1/1995 |
| JP | 2008052660 | A | 3/2008 |

OTHER PUBLICATIONS

J. Rust, Optimal Replacement of GMC Bus Engines: An Empirical Model of Harold Zurcher, Econometrica 55, 5, 999-1033. 1987.

Zhu et al. Intelligent Maintenance Support System for Syncrude Mining Trucks, 1993 Canadian Conference on Electrical and Computer Engineering, Vancouver, 1217-1220.

Lam et al. Optimal Maintenance—Policies for Deteriorating Systems under Various Maintenance Strategies, IEEE Transactions on Reliability 43, 3, 423-430. 1994.

Wu et al. A Neural Network Integrated Decision Support System for Condition-Based Optimal Predictive Maintenance Policy, IEEE Transactions on Systems, Man, and Cybernetics Part A: System and Humans, 37, 2, 226-236. 2007.

Murphy, Kevin P. Machine Learning: a Probabilistic Perspective, The MIT Press, 2012. Table of Contents. Year Year Year.

Wikipedia, Survival Analysis, Sep. 18, 2014, https://en.wikipedia.org/w/index.php?title=Survival_analysis&oldid=626053780.

Therneau, Terry. Extending the Cox Model, Technical Report No. 58, Nov. 1996.

Hastie et al. The Elements of Statistical Learning: Data Mining, Inference and Prediction, The Mathematical Intelligencer 27.2 (2005): 83-85.

Mannila et al. Discovery of Frequent Episodes in Event Sequences, Data Mining and Knowledge Discovery 1.3 (1997): 259-289.

Bair et al. Prediction by Supervised Principal Components, Journal of the American Statistical Association, 101(473). 2006.

Banjevic et al. A Control-Limit Policy and Software for Condition-Based Maintenance Optimization, INFOR-OTTAWA-, 39(1), 32-50. 2001.

Fox J. Cox Proportional-Hazards Regression for Survival Data, 2002.

Jardine et al. Repairable System Reliability: Recent Developments in CBM Optimization, International Journal of Performability Engineering, 4(3), 205. 2008.

Scholkopf et al. Learning with Kernels, MIT press Cambridge, 2002.

Wu et al. Optimal Replacement in the Proportional Hazards Model with Semi-Markovian Covariate Process and Continuous Monitoring, Reliability, IEEE Transactions on, 60(3),580-589. 2011.

Zaki, M.J. Spade, An Efficient Algorithm for Mining Frequent Sequences, Machine Learning, 42(1-2), 31-60.

Bachetti et al. Survival Trees with Time-Dependent Covariates: Application to Estimating Changes in the Incubation Period of AIDS, Lifetime Data Anal., vol. 1, No. 1, pp. 35-47, 1995.

Breiman et al. Classification and Regression Trees, 1st ed. Chapman and Hall/CRC, 1984.

Friedman et al. Additive Logistic Regression: a Statistical View of Boosting, (With Discussion and a Rejoinder by the Authors), Ann. Stat., vol. 28, No. 2, pp. 337-407, Apr. 2000.

Hothorn et al. Survival Ensembles, Biostat, vol. 7, No. 3, pp. 355-373, Jul. 2006.

Huang et al. Piecewise Exponential Survival Trees with Time-Dependent Covariates, Biometrics, vol. 54. No. 4, pp. 1420-1433, Dec. 1998.

Motorola Inc. et al. New Method and Apparatus for Device Failure Assessment, IPCOM000159857D, Oct. 2007.

IBM, Method of Component Failure Prediction in Large Server and Storage Systems, Jan. 13, IPCOM000191729D, 2010.

An et al. Fatigue Life Prediction Based on Bayesian Approach to Incorporate Field Data into Probability Model, Structural Engineering and Mechanics, vol. 37, No. 4, p. 427-442, 2011.

Jardine et al. A Review on Machinery Diagnostics and Prognostics Implementing Condition-Based Maintenance, in: Mechanical Systems and Signal Processing, 20, 2006, pp. 1483-1510.

Peng et al. Current Status of Machine Prognostics in Condition-Based Maintenance: a Review, in: International Journal of Advanced Manufacturing Technology, 50, 2010, pp. 297-313.

Lin et al. Filters and Parameter Estimation for a Partially Observable System Subject to Random Failure with Continuous-Range Observations, in: Advances in Applied Probability, 36(4), 2004, pp. 1212-1230.

Lin et al. On-Line Parameter Estimation for a Failure-Prone System Subject to Condition Monitoring, in: Journal of Applied Probability, 41(1), 2004, pp. 211-220.

S. Mussi, General Environment for Probabilistic Predictive Monitoring, International Journal of Computers vol. 7, No. 2, 31-49. 2013.

S. Mussi, Probabilistic Predictive Monitoring with CHEERUP, International Journal of Computers vol. 6, No. 1, 93-102. 2012.

Liao et al. Predictive Monitoring and Failure Prevention of Vehicle Electronic Components and Sensor Systems, SAE Technical Paper 2006-01-0373, 2006, doi:10.4271/2006-01-0373. 2006.

Jardine et al. Repairable System Reliability: Recent Developments in CBM Optimization, 19th International Congress and Exhibition on Condition Monitoring and Diagnostic Engineering Management (COMADEM). Lulea, Sweden, Jun. 2006.

(56) References Cited

OTHER PUBLICATIONS

Ataman et al. Knowledge Discovery in Mining Truck Databases, Proceedings. 17th International Mining Congress, The Chamber of Mining Engineers of Turkey, Ankara, 2001.

Hu et al. Early Detection of Mining Truck Failure by Modeling its Operation with Neural Networks Classification Algorithms, Application of Computers and Operations Research in the Minerals Industries, South African Institute of Mining and Metallurgy, 2003.

Ahmad et al. An Overview of Time-Based and Condition-Based Maintenance in Industrial Application, Computers and Industrial Engineering 63, 1, 135-149. 2012.

Jardine et al., "Optimal replacement policy and the structure of software for condition-based maintenance," Journal of Quality in Maintenance Engineering 3, 2, 109-119. 1997.

Jardine et al., Maintenance, replacement, and reliability: theory and applications. CRC Press LLC, 2013.

Zhang, An Introduction to Support Vector Machines and Other Kernel-Based Learning Methods—A Review. AI Magazine vol. 22 No. 2 (2001).

Singer et al., Applied longitudinal data analysis: Modeling change and event occurrence. http://gseacademic.harvard.edu/alda/. Jun. 1, 2005.

Lin et al., "Using principal components in a proportional hazards model with applications in condition-based maintenance," Journal of Operational Research Society 57, 910-919. 2006.

List of IBM Patents or Applications Treated as Related.

\* cited by examiner

GENERATING ESTIMATES OF FAILURE RISK FOR A VEHICULAR COMPONENT IN SITUATIONS OF HIGH-DIMENSIONAL AND LOW SAMPLE SIZE DATA

FIELD OF THE INVENTION

Embodiments of the invention generally relate to information technology, and, more particularly, to vehicle monitoring and maintenance.

BACKGROUND

For condition-based maintenance (CBM) of machinery such as vehicles, data-driven methodologies are commonly used in an attempt to infer failure probabilities based on the current vehicle condition. For building underlying models that accurately incorporate relevant features, a significant amount of historic data on failures and machine conditions is required.

In domains wherein failures and downtime are costly, providers commonly establish replacement policies that are cautious and often overly conservative. One context that commonly gives rise to such shortcomings is a context of high-dimensional and low sample size data. Accordingly, a need exists for techniques to generate robust estimates of failure risk for high-dimensional and low sample size data.

SUMMARY

In one aspect of the present invention, techniques for generating estimates of failure risk for a vehicular component in situations of high-dimensional and low sample size data are provided. A first example computer-implemented method can include splitting a first input time series comprising multiple data points derived from a vehicular component across a fleet of multiple vehicles into multiple sub-time series, wherein each of the multiple sub-time series comprises a portion of the multiple data points in the first input time series. The method also includes generating, based on a full likelihood model fitting across the multiple data points in the first input time series, a first failure status predicting function of a first selected sub-time series from the multiple sub-time series that has the best fit to the multiple data points; and deleting, from the first input time series, the portion of the multiple data points that corresponds to the first selected sub-time series, thereby generating a modified first input time series. Further, the method includes generating, based on a full likelihood model fitting across the multiple data points in the modified first input time series, a first failure status predicting function of a second selected sub-time series from the multiple sub-time series that has the best fit to the multiple data points excluding the deleted portion; and deleting, from the modified first input time series, the portion of the multiple data points that corresponds to the second selected sub-time series, thereby generating a further modified first input time series. The method additionally includes generating, based on a partial likelihood model fitting across a given sub-set of the multiple data points in the first input time series, a second failure status predicting function of each selected sub-time series that has the best fit to the given sub-set of the multiple data points; applying the second failure status predicting function of each selected sub-time series to a second input time series derived from the vehicular component to calculate multiple prediction of failure values for the second input time series; and identifying the largest of the multiple prediction of failure values as an estimate of failure risk for the vehicular component.

In another aspect of the invention, a second example computer-implemented method can include the steps of the first example method above, repeating a portion of said steps for a given number of additional selected sub-time series from the multiple sub-time series, and generating, based on a partial likelihood model fitting across a given sub-set of the multiple data points in the first input time series, a second failure status predicting function of multiple combinations of two or more selected sub-time series that has the best fit to the given sub-set of the multiple data points. Further, the second example method includes applying the second failure status predicting function of each of the multiple combinations of two or more selected sub-time series to a second input time series derived from the vehicular component to calculate multiple prediction of failure values for the second input time series; and identifying the largest of the multiple prediction of failure values as an estimate of failure risk for the vehicular component.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for generating estimates of failure risk (for example, non-wear related failure risk) for a vehicular component derived from high-dimensional and low sample size data. As used herein, high-dimensional data refer to data comprising a multitude of features and/or variables that can potentially be responsible for and/or influential in a failure of a vehicular component.

As noted herein, some vehicle management approaches include implementing models that attempt to filter, from a potentially large space of condition measurements, an appropriate selection of features with a statistically significant effect on a given outcome variable. However, challenges can arise because such models need also be sensitive to the selection bias inherently accompanied by the generally small numbers of failure events.

Two common model types for data-driven CBM systems include time-dependent proportional hazards models (PHM) and Hidden Markov models (HMM). However, the dynamics of features are often more likely to stay undiscovered as the number of failure cases decreases. Using the partial likelihood, values of features in between failure times are omitted, although this information might reduce selection bias.

Alternatively, HMMs maintain features in each time interval and, therefore, are expected to have a smaller bias. However, the likelihood in HMMs cannot be expressed in a closed form, as is the case in PHMs. For maximum likelihood estimation (MLE), for example, an iterative expectation maximization (EM) routine is performed while the E-step itself involves recursive forward and backward propagations. It is therefore not always advantageous to use HMMs as the underlying selection mechanism, particularly not in settings with large feature spaces (as is often confronted within data-driven CBM systems). Consequently, one or more embodiments of the invention include techniques for generating estimates of failure risk for a vehicular component derived from high-dimensional and low sample size data.

Figure 1:
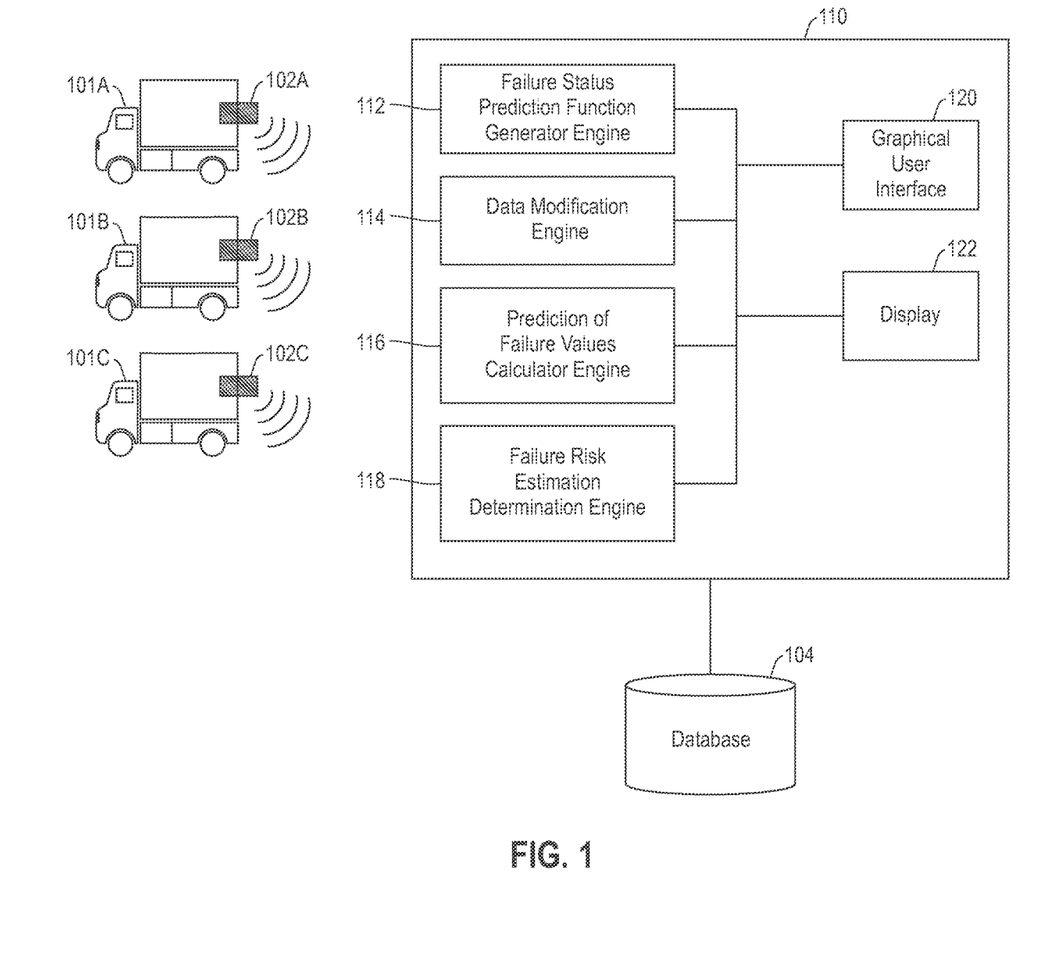
FIG. 1 is a diagram illustrating system architecture, according to an example embodiment of the invention.

FIG. 1 is a diagram illustrating system architecture, according to an example embodiment of the present invention. By way of illustration, FIG. 1 depicts a risk failure estimation system 110, which receives input from sensors 102A, 102B and 102C resident on and/or connected to vehicles 101A, 101B and 101C, respectively. By way merely of example, the input from sensors 102A, 102B and 102C can be transmitted wirelessly to the system 110 and/or can be transmitted to the system 110 via a direct electrical connection (for instance, via creating an electrical connection or interface between a given sensor and the system 110 upon detaching the sensor from a given vehicle).

As illustrated in FIG. 1, the system 110 includes a failure status prediction function generator engine 112, a data modification engine 114, a prediction of failure values calculator engine 116, a failure risk estimation determination engine 118, a graphical user interface 120 and a display 122. As further detailed herein, engines 112, 114, 116 and 118 process multiple forms of data to generate a failure risk estimate (for example, a non-wear related failure risk estimate) for one or more given vehicular components based on the input provided by sensors 102A, 102B and 102C. As detailed herein, generated data, classifications and calculations can be stored by the system 110 in database 104. The generated failure risk estimate for the given vehicular components are transmitted to the graphical user interface 120 and the display 122 for presentation and/or potential manipulation by a user.

At least one embodiment of the invention includes obtaining and/or receiving, as input, a set of original time series, each of which represents a history of multiple sample data points, and wherein each sample data point includes a combination of measurements. Such measurements can include, for example, a measurement indicating failure or non-failure of a given vehicular component, derived from the vehicular component (such as, from a sensor on and/or associated with the component).

From the set of original time series, at least one embodiment of the invention includes generating a failure status predicting function to optimize a penalized full likelihood score. Additionally, in one or more embodiments of the invention, a full likelihood model is selected to preclude omission of sample data points between failure times and to decrease the selection bias that results from omitting sample points.

In at least one embodiment of the invention, generating the failure status predicting function includes adding a measurement variable to a logistic regression model as an independent variable, and fitting the logistic regression model to all sample data points of all original time series. Additionally, such an embodiment includes calculating the penalized full likelihood score for the fitted logistic regression model. One example penalized full likelihood score for a fitted logistic regression model such as detailed herein includes the Akaike information criterion, as would be appreciated by one skilled in the art.

At least one embodiment of the invention further includes generating a set of multiple neighbors, wherein each neighbor includes the previous set of independent variables minus one element or plus one other measurement variable. For each neighbor, at least one embodiment of the invention includes fitting a logistic regression and calculating the penalized likelihood score, such as described above. Further, the above-noted steps are repeated in one or more embodiments of the invention when a new set of is independent variables includes the neighbor with the highest penalized likelihood score. Such an embodiment can include repeating iterations of these noted steps until no further improvement of the penalized likelihood can be achieved.

The resulting set of measurement variables are stored in a database and deleted from the original sample data points. Additionally, as noted at least one embodiment of the invention includes repeating each of the above steps until there is no improvement as compared to the penalized full likelihood score generated using the empty set of measurement variables.

As detailed herein, repetition of the measurement variable selection procedure enables one or more embodiments of the invention to consider and/or incorporate predictors that insignificantly add value in a small sample set for selection for an alternative failure status predicting function that potentially adds significant value in a larger sample set. Accordingly, for each stored set of measurement variables, a failure status predicting function is generated by fitting a partial likelihood model (such as, for example, the Cox proportional hazards model).

By implementing a partial likelihood model (such as the Cox proportional hazards model, for instance), at least one embodiment of the invention can include maintaining a monotonically increasing baseline failure risk wherein the measurement variables are added proportionally. Such an embodiment further includes obtaining new and/or additional time series data of a given vehicular component as input, and calculating predictions of failure values from the generated failure status predicting functions. Subsequently, at least one embodiment of the invention includes selecting and outputting the highest prediction of failure value as the estimate of non-wear related failure risk for the given vehicular component.

Figure 2:
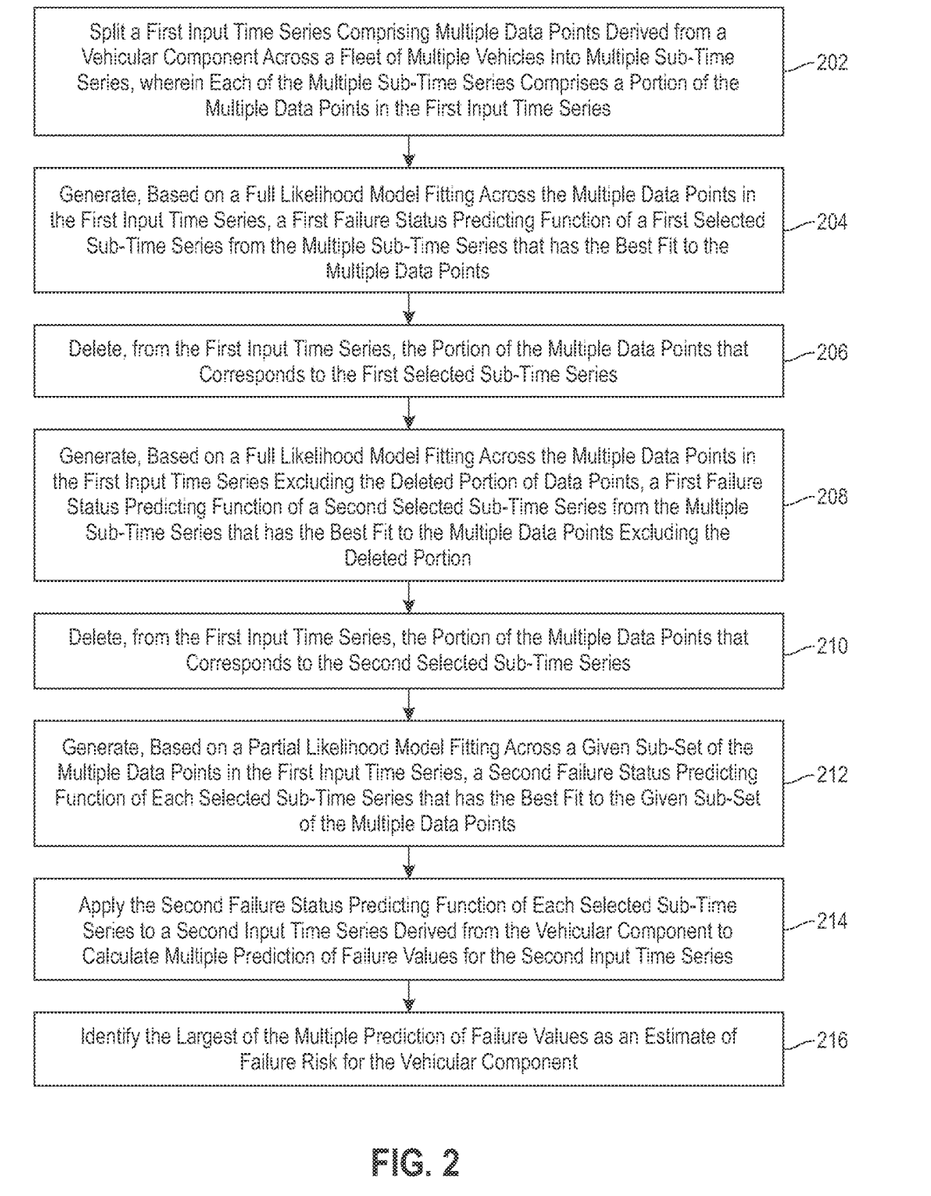
FIG. 2 is a flow diagram illustrating techniques according to an embodiment of the invention.

FIG. 2 is a flow diagram illustrating techniques according to an embodiment of the present invention. Step 202 includes splitting a first input time series comprising multiple data points derived from a vehicular component across a fleet of multiple vehicles into multiple sub-time series, wherein each of the multiple sub-time series comprises a portion of the multiple data points in the first input time series. Step 204 includes generating, based on a full likelihood model fitting across the multiple data points in the first input time series, a first failure status predicting function of a first selected sub-time series from the multiple sub-time series that has the best fit to the multiple data points. Step 206 includes deleting, from the first input time series, the portion of the multiple data points that corresponds to the first selected sub-time series, thereby generating a modified first input time series.

Step 208 includes generating, based on a full likelihood model fitting across the multiple data points in the modified first input time series, a first failure status predicting function of a second selected sub-time series from the multiple sub-time series that has the best fit to the multiple data points excluding the deleted portion. Generating the first failure status predicting function can include generating the first failure status predicting function via logistic regression. Step 210 includes deleting, from the modified first input time series, the portion of the multiple data points that corresponds to the second selected sub-time series, thereby generating a further modified first input time series.

Step 212 includes generating, based on a partial likelihood model fitting across a given sub-set of the multiple data points in the first input time series, a second failure status predicting function of each selected sub-time series that has the best fit to the given sub-set of the multiple data points. Generating the second failure status predicting function can include generating the second failure status predicting function via logistic regression. Additionally, the given sub-set of the multiple data points in the first input time series can include measurements from each time point corresponding to a failure of the vehicular component.

Step 214 includes applying the second failure status predicting function of each selected sub-time series to a second input time series derived from the vehicular component to calculate multiple prediction of failure values for the second input time series. Step 216 includes identifying the largest of the multiple prediction of failure values as an estimate of failure risk for the vehicular component.

The techniques depicted in FIG. 2 can also include obtaining the first input time series, wherein the first input time series comprises the multiple data points, and wherein the multiple data points correspond to multiple measurements derived from the vehicular component. Additionally, the portion of the multiple data points associated with each sub-time series can correspond to one of the multiple measurements derived from the vehicular component. Also, the multiple measurements derived from the vehicular component can include measurements associated, for example, with non-wear related data for the vehicular component.

The techniques depicted in FIG. 2 can additionally include repeating, for a given number of additional selected sub-time series from the multiple sub-time series: (i) generating, based on a full likelihood model fitting across the multiple data points in the further modified first input time series, a first failure status predicting function of an additional selected sub-time series from the multiple sub-time series that has the best fit to the multiple data points excluding the deleted portions; and (ii) deleting, from the further modified first input time series, the portion of the multiple data points that corresponds to the additional selected sub-time series. The given number of additional selected sub-time series can include, for example, all of the multiple sub-time series. Also, the given number of additional selected sub-time series can include a number of additional selected sub-time series prior to generating a failure status prediction function that indicates no improvement compared to an empty set of measurements.

As described herein, in at least one embodiment of the invention, each of the first input time series and the second input time series is derived from a set of sensor readings corresponding to the vehicular component. Further, at least one embodiment of the invention includes storing each selected sub-time series in a database.

One or more embodiments of the invention, additionally, can include repeating, for a given number of additional selected sub-time series from the multiple sub-time series: (i) generating, based on a full likelihood model fitting across the multiple data points in the further modified first input time series, a first failure status predicting function of an additional selected sub-time series from the multiple sub-time series that has the best fit to the multiple data points excluding the deleted portions; and (ii) deleting, from the further modified first input time series, the portion of the multiple data points that corresponds to the additional selected sub-time series. Such an embodiment further include generating, based on a partial likelihood model fitting across a given sub-set of the multiple data points in the first input time series, a second failure status predicting function of multiple combinations of two or more selected sub-time series that has the best fit to the given sub-set of the multiple data points. Further, such an embodiment includes applying the second failure status predicting function of each of the multiple combinations of two or more selected sub-time series to a second input time series derived from the vehicular component to calculate multiple prediction of failure values for the second input time series, and similarly identifying the largest of the multiple prediction of failure values as an estimate of failure risk for the vehicular component.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
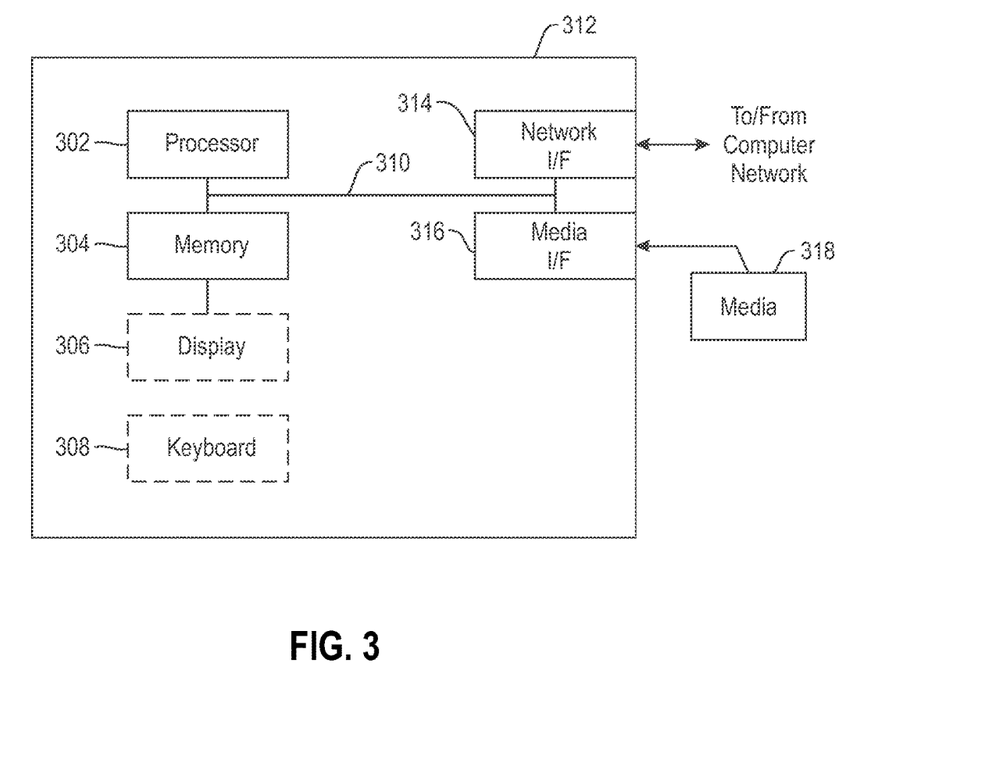
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating estimates of failure risk for high-dimensional and low sample size data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:
   (a) splitting a first input time series comprising multiple data points derived from a vehicular component across a fleet of multiple vehicles into multiple sub-time series, wherein each of the multiple sub-time series comprises a portion of the multiple data points in the first input time series;
   (h) generating, based on a full likelihood model fitting across the multiple data points in the first input time series, a first failure status predicting function of a first selected sub-time series from the multiple sub-time series that has the best fit to the multiple data points;

(c) deleting, from the first input time series, the portion of the multiple data points that corresponds to the first selected sub-time series, thereby generating a modified first input time series;

(d) generating, based on a full likelihood model fitting across the multiple data points in the modified first input time series, a first failure status predicting function of a second selected sub-time series from the multiple sub-time series that has the best fit to the multiple data points excluding the deleted portion;

(e) deleting, from the modified first input time series, the portion of the multiple data points that corresponds to the second selected sub-time series, thereby generating a further modified first input time series;

(f) generating, based on a partial likelihood model fitting across a given sub-set of the multiple data points in the first input time series, a second failure status predicting function of each selected sub-time series that has the best fit to the given sub-set of the multiple data points;

(g) applying the second failure status predicting function of each selected sub-time series to a second input time series derived from the vehicular component to calculate multiple prediction of failure values for the second input time series;

(h) identifying the largest of the multiple prediction of failure values as an estimate of failure risk for the vehicular component; and (i) replacing the vehicular component in each of the multiple vehicles based at least in part on the estimate of failure risk for the vehicular component;

wherein the steps are carried out by at least one computing device.

2. The method of claim 1, wherein the multiple data points correspond to multiple measurements derived from the vehicular component.

3. The method of claim 2, wherein the portion of the multiple data points associated with each sub-time series corresponds to one of the multiple measurements derived from the vehicular component.

4. The method of claim 1, comprising:
storing each selected sub-time series in a database.

5. The method of claim 1, wherein each of said first input time series and said second input time series is derived from a set of sensor readings corresponding to the vehicular component.

6. The method of claim 1, comprising generating the first failure status predicting function via logistic regression.

7. The method of claim 1, comprising generating the second failure status predicting function via logistic regression.

8. The method of claim 1, comprising:
repeating, for a given number of additional selected sub-time series from the multiple sub-time series:
generating, based on a full likelihood model fitting across the multiple data points in the further modified first input time series, a first failure status predicting function of an additional selected sub-time series from the multiple sub-time series that has the best fit to the multiple data points excluding the deleted portions; and
deleting, from the further modified first input time series, the portion of the multiple data points that corresponds to the additional selected sub-time series.

9. The method of claim 8, wherein said given number of additional selected sub-time series comprises all of the multiple sub-time series.

10. The method of claim 8, wherein said given number of additional selected sub-time series comprises a number of additional selected sub-time series prior to generating a failure status prediction function that indicates no improvement compared to an empty set.

11. The method of claim 1, wherein the given sub-set of the multiple data points in the first input time series comprises measurements from each time point corresponding to a failure of the vehicular component.

12. A computer program product, the computer program product comprising a non-transitory computer readable storage medium having program instructions embodied therewith, the program instructions executable by a computing device to cause the computing device to:

(a) split a first input time series comprising multiple data points derived from a vehicular component across a fleet of multiple vehicles into multiple sub-time series, wherein each of the multiple sub-time series comprises a portion of the multiple data points in the first input time series;

(h) generate, based on a full likelihood model fitting across the multiple data points in the first input time series, a first failure status predicting function of a first selected sub-time series from the multiple sub-time series that has the best fit to the multiple data points;

(c) delete, from the first input time series, the portion of the multiple data points that corresponds to the first selected sub-time series, thereby generating a modified first input time series;

(d) generate, based on a full likelihood model fitting across the multiple data points in the modified first input time series, a first failure status predicting function of a second selected sub-time series from the multiple sub-time series that has the best fit to the multiple data points excluding the deleted portion;

(e) delete, from the modified first input time series, the portion of the multiple data points that corresponds to the second selected sub-time series, thereby generating a further modified first input time series;

(f) generate, based on a partial likelihood model fitting across a given sub-set of the multiple data points in the first input time series, a second failure status predicting function of each selected sub-time series that has the best fit to the given sub-set of the multiple data points;

(g) apply the second failure status predicting function of each selected sub-time series to a second input time series derived from the vehicular component to calculate multiple prediction of failure values for the second input time series;

(h) identify the largest of the multiple prediction of failure values as an estimate of failure risk for the vehicular component; and (i) replace the vehicular component in each of the multiple vehicles based at least in part on the estimate of failure risk for the vehicular component.

13. A system comprising:
a memory; and
at least one processor coupled to the memory and configured for:
(a) splitting a first input time series comprising multiple data points derived from a vehicular component across a fleet of multiple vehicles into multiple sub-time series, wherein each of the multiple sub-time series comprises a portion of the multiple data points in the first input time series;
(b) generating, based on a full likelihood model fitting across the multiple data points in the first input time series, a first failure status predicting function of a first selected sub-time series from the multiple sub-time series that has the best fit to the multiple data points;
(c) deleting, from the first input time series, the portion of the multiple data points that corresponds to the first selected sub-time series, thereby generating a modified first input time series;
(d) generating, based on a full likelihood model fitting across the multiple data points in the modified first input time series, a first failure status predicting function of a second selected sub-time series from the multiple sub-time series that has the best fit to the multiple data points excluding the deleted portion;
(e) deleting, from the modified first input time series, the portion of the multiple data points that corresponds to the second selected sub-time series, thereby generating a further modified first input time series;
(f) generating, based on a partial likelihood model fitting across a given sub-set of the multiple data points in the first input time series, a second failure status predicting function of each selected sub-time series that has the best fit to the given sub-set of the multiple data points;
(g) applying the second failure status predicting function of each selected sub-time series to a second input time series derived from the vehicular component to calculate multiple prediction of failure values for the second input time series;
(h) identifying the largest of the multiple prediction of failure values as an estimate of failure risk for the vehicular component; and
(i) replacing the vehicular component in each of the multiple vehicles based at least in part on the estimate of failure risk for the vehicular component.

14. A method comprising the following steps:
(a) splitting a first input time series comprising multiple data points derived from a vehicular component across a fleet of multiple vehicles into multiple sub-time series, wherein each of the multiple sub-time series comprises a portion of the multiple data points in the first input time series;
(b) generating, based on a full likelihood model fitting across the multiple data points in the first input time series, a first failure status predicting function of a first selected sub-time series from the multiple sub-time series that has the best fit to the multiple data points;
(c) deleting, from the first input time series, the portion of the multiple data points that corresponds to the first selected sub-time series, thereby generating a modified first input time series;
(d) generating, based on a full likelihood model fitting across the multiple data points in the modified first input time series, a first failure status predicting function of a second selected sub-time series from the multiple sub-time series that has the best fit to the multiple data points excluding the deleted portion;
(e) deleting, from the modified first input time series, the portion of the multiple data points that corresponds to the second selected sub-time series, thereby generating a further modified first input time series;
(f) repeating, for a given number of additional selected sub-time series from the multiple sub-time series:
generating, based on a full likelihood model fitting across the multiple data points in the further modified first input time series, a first failure status predicting function of an additional selected sub-time series from the multiple sub-time series that has the best fit to the multiple data points excluding the deleted portions; and
deleting, from the further modified first input time series, the portion of the multiple data points that corresponds to the additional selected sub-time series;
(g) generating, based on a partial likelihood model fitting across a given sub-set of the multiple data points in the first input time series, a second failure status predicting function of multiple combinations of two or more of the selected sub-time series that has the best fit to the given sub-set of the multiple data points;
(h) applying the second failure status predicting function of each of the multiple combinations of two or more selected sub-time series to a second input time series derived from the vehicular component to calculate multiple prediction of failure values for the second input time series;
(i) identifying the largest of the multiple prediction of failure values as an estimate of failure risk for the vehicular component; and
(i) replacing the vehicular component in each of the multiple vehicles based at least in part on the estimate of failure risk for the vehicular component;
wherein the steps are carried out by at least one computing device.

15. The method of claim 14, wherein the multiple data points correspond to multiple measurements derived from the vehicular component.

16. The method of claim 14, comprising:
storing each selected sub-time series in a database.

17. The method of claim 14, comprising generating the first failure status predicting function via logistic regression.

18. The method of claim 14, comprising generating the second failure status predicting function via logistic regression.

19. The method of claim 14, wherein said given number of additional selected sub-time series comprises all of the multiple sub-time series.

20. The method of claim 14, wherein said given number of additional selected sub-time series comprises a number of additional selected sub-time series prior to generating a failure status prediction function that indicates no improvement compared to an empty set.

* * * * *